United States Patent Office 2,926,176
Patented Feb. 23, 1960

2,926,176

CONDENSATION OF AROMATIC SULFONIC ACIDS WITH CARBOHYDRATES AND RELATED MATERIALS

Carl B. Linn, Riverside, Ill., assignor, by mesne assignments, to Universal Oil Products Company, Des Plaines, Ill., a corporation of Delaware No Drawing. Application June 18, 1957
Serial No. 666,484

5 Claims. (Cl. 260—345.9)

This application is a continuation-in-part of my co-pending application Serial No. 401,068, filed December 29, 1953, now Patent No. 2,798,079.

This invention relates to a process for interacting aromatic sulfonic acids with carbohydrates and materials closely related to carbohydrates. The process relates more particularly to the condensation of simple sugars, their desoxy- and omega-carboxy derivatives, compound sugars or oligosaccharides, and polysaccharides with aromatic sulfonic acids in the presence of a hydrogen fluoride catalyst.

An object of this invention is to produce organic materials suitably for use per se or as intermediates in the manufacture of detergents, pharmaceuticals, explosives, gelling agents, surface coatings, resins, and oxidation inhibitors by condensing aromatic sulfonic acids with carbohydrates or with carbohydrates derivatives.

One embodiment of this invention relates to a process which comprises condensing an aromatic sulfonic acid with a carbohydrate in the presence of a hydrogen fluoride catalyst to produce a compound selected from the group consisting of a sulfoaryl-desoxy-alditol and a sulfoaryl-desoxy-ketitol, and recovering said resultant condensation product.

A specific embodiment of this invention relates to a process which comprises condensing benzene sulfonic acid with glucose in the presence of a hydrogen fluoride catalyst to produce a 1-(sulfophenyl)-1-desoxy-glucitol, and recovering said resultant condensation product.

I have found that useful water-insoluble condensation products and also water-soluble condensation products are formed by reacting aromatic sulfonic acids with carbohydrates and related substances in the presence of a hydrogen fluoride catalyst. These reactions may be carried out in steel equipment or other suitable apparatus lined silver, cooper, and certain alloys such as Monel metal and the like. This treatment may be effected at a temperature of from −40° to about 100° C. and preferably at temperatures of from about −10° to about +50° C. The pressure at which the reaction is carried out will vary with the reaction temperature used and the mol fractions of reactants and hydrogen fluoride catalyst present. While many of the condensation reactions are carried out at substantially atmospheric pressure, it may be desirable in certain instances and with certain reactants to carry out the reaction at pressures up to about 100 atmospheres or more. It is convenient in most instances to operate the equipment utilized at the pressure generated by the reaction mixture and the catalyst contained therein.

Aromatic sulfonic acids which may be used as starting materials in the process of this invention include benzene sulfonic acid, ortho-tolyl sulfonic acid, meta-tolyl sulfonic acid, para-tolyl sulfonic acid, ortho-xylyl sulfonic acid, meta-xylyl sulfonic acid, para-xylyl sulfonic acid, para-chlorobenzene sulfonic acid, para-bromobenzene sulfonic acid, ortho-nitrobenzene sulfonic acid, meta-nitrobenzene sulfonic acid, para-nitrobenzene sulfonic acid, meta-benzene disulfonic acid, para-benzene disulfonic acid, ethylbenzene sulfonic acid, n-propylbenzene sulfonic acid, butylbenzene sulfonic acids, hexylbenzene sulfonic acids, nonylbenzene sulfonic acids, dodecylbenzene sulfonic acids, pentadecylbenzene sulfonic acids, hexyltoluene sulfonic acids, nonyltoluene sulfonic acids, dodecyltoluene sulfonic acids, and alpha-naphthyl sulfonic acid.

Carbohydrates which are condensed with aromatic sulfonic acids in the process of this invention to form a compound selected from the group consisting of a sulfoaryl-desoxy-alditol and a sulfoaryl-desoxy-ketitol include simple sugars, their desoxy- and their omega-carboxy derivatives, compound sugars or oligosaccharides, and polysaccharides.

Simple sugars include dioses, trioses, tetroses, pentoses, hexoses, heptoses, octoses, nonoses, and decoses. Compound sugars include disaccharides, trisaccharides, and tetrasaccharides. Polysaccharides include polysaccharides composed of only one type of sugar residue, polysaccharides composed of more than one type of sugar unit, polysaccharides composed of one type of uronic acid unit, polyuronides, polysaccharides composed of aldose (pentose or hexose) and uronic acid units, polysaccharides containing hexose units esterified with an inorganic acid, and polysaccharides containing amino sugar units.

Utilizable simple sugars include the diose, glycolaldehyde; trioses, such as glyceryaldehyde and s-dihydroxyacetone; tetroses, such as erythrose, threose, erythrulose, and apiose; the pentoses, such as arabinose, xylose, ribose, lyxose, rhamnose (a methylpentose), fucose (a methylpentose), rhodeose (a methylpentose), digitalose (a methoxymethylpentose), ketoxylose (a ketopentose), 2-desoxy-ribose and 2-desoxy-methylpentose (digitoxose); hexoses, such as mannose, glucose, idose, gulose, galactose, talose, allose, fructose, sorbose, tagatose, and psicose; heptoses, such as glucoheptose, mannoheptose, galactoheptose, sedoheptose, mannoketoheptose, glucoheptulose and perseulose; octoses, such as glucooctoses, mannooctose, and galactooctose; nonoses, such as gluconoose, mannononose; and decoses, such as glucodecose. Desoxy derivatives of simple sugars are formed by the replacement of a hydroxyl substituent in a sugar with hydrogen thereby forming a methyl or methylene linkage. The desoxypentoses and desoxyhexoses are the most commonly occurring of such compounds. The omega-carboxy derivatives of simple sugars, which are suitable in the process of the present invention include tartronic semialdehyde or its tautomer, hydroxypyruvic acid; alpha-gamma-dihydroxyacetoacetic acid, threuronic acid, 4-keto-2,3,5-trihydroxypentanoic acid, xyluronic acid, 5-keto-tetrahydroxyhexanoic acids such as 5-keto-allonic acid, 5-keto-gluconic acid, 5-keto-mannonic acid, 5-keto-gulonic acid, and 5-keto-galactonic acid; uronic acids containing 6 carbon atoms such as glucuronic acid, mannuronic acid, and galacturonic acid, and the 6-keto-pentahydroxyheptanoic acids. The simple sugars and their omega-carboxy derivatives, as starting materials for the process of this invention, may be represented by the following general formula:

in which A equals H and $CH_2OH$, $n$ equals an integer from 1 to about 12 or so, and B equals H, $CH_2OH$, and COOH. As an example of the utility of this general formula, when A=H, $n$=1, and B=H, the compound is glycolaldehyde; when A=H, $n$=1, and B=$CH_2OH$, the compound is glycerylaldehyde; when A=H, n=1, and B=COOH, the compound is tartronic semialdehyde, a tautomer of hydroxypyruvic acid; when A=CH$_2$OH, n=1, and B=H, the compound is s-dihydroxyacetone; when A=CH$_2$OH, n=1, and B=CH$_2$OH, the compound is erythrulose; when A=CH$_2$OH, n=1, and B=COOH, the compound is alpha-gamma-dihydroxyacetoacetic acid; when A=H, n=2, and B=CH$_2$OH, the compound is erythrose or threose; when A=H, n=2, and B=COOH, the compound is threuronic acid; when A=CH$_2$OH, n=2, and B=CH$_2$OH, the compound is riboketose or xyloketose; when A=CH$_2$OH, n=2, and B=COOH, the compound is a 4-keto-2,3,5-trihydroxypentanoic acid; when A=H, n=3, and B=CH$_2$OH, the compound is ribose, arabinose, xylose or lyxose; when A=H, n=3, and B=COOH, the compound is a 5 carbon atom uronic acid such as xyluronic acid; when A=CH$_2$OH, n=3, and B=CH$_2$OH, the compound is psicose, fructose, sorbose, or tagatose; when A=CH$_2$OH, n=3, and B=COOH, the compound is a 5-keto-tetrahydroxy-hexanoic acid; when A=H, n=4, and B=CH$_2$OH, the compound is allose, altruose, glucose, mannose, gulose, idose, galactose, or talose; when A=H, n=4, and B=COOH, the compound is a 6 carbon atom uronic acid such as glucuronic acid, mannuronic acid, and galacturonic acid; when A=CH$_2$OH, n=4, and B=CH$_2$OH, the compounds are heptoses; and when A=CH$_2$OH, n=4, and B=COOH, the compounds are 6-keto-pentahydroxyheptanoic acids.

The utilizable oligosaccharides or compound sugars include disaccharides such as the pentose-hexose disaccharides including glucoapiose, vicianose and primeverose; the methylpentose-hexose disaccharides including glycorhamnoside, and rutinose; and the dihexoses such as turanose, maltose, lactose, cellobiose, gentiobiose, melibiose, sucrose, and trehalose. Other compound sugars are represented by trisaccharides such as the methylpentose-hexose saccharides including rhaminose and robinose; the trihexose saccharides including raffinose, melezitose, and gentianose. An example of a suitable tetrasaccharide is stachyose.

Various polysaccharides are also utilizable in the process of the present invention. These polysaccharides include pentosans such as araban, methylpentosans such as fucosan, and hexosans such as starch, cellulose, glycogen, inulin, mannan, galactan, lichenin, levan, dextran, and laminarin. Other polysaccharides which are composed of more than one type of sugar unit such as pentosans like araboxylan, and the hexosans like galactomannan may be used. Other utilizable polysaccharides are represented by those composed of uronic acid units and aldose units such as gum arabic, damson gum, gum tragacanth, linseed mucilage, pectins, those composed of uronic acid units such as pectic acid and alginic acid, and those containing hexose units esterified with an inorganic acid such as certain sea weed polysaccharides like agar.

The hydrogen fluoride catalyst which is used in this process may be used in anhydrous form or diluted with water to make a hydrofluoric acid of the desired concentration. The hydrofluoric acid may also be further diluted with various inert diluents when it is desirable to operate the process of this invention with low hydrogen fluoride concentrations. Suitable inert diluents include the perfluoro derivatives of n-paraffinic hydrocarbons such as perfluoropropane, perfluoro-n-butane, perfluoro-n-pentane, perfluoro-n-hexane, etc. Other suitable diluents are well known to those skilled in the art, for example, cycloparaffins such as cyclopentane or cyclohexane may be utilized. In some instances, hydrofluoric acid of from about 85 to about 100% HF concentration is desirable, and in some instances it is most desirable to use anhydrous hydrogen fluoride as the catalyst.

The process may be carried out by slowly adding a hydrogen fluoride catalyst to a stirred mixture of aromatic sulfonic acid and carbohydrate or related material being subjected to reaction while maintaining the reaction temperature at from about −40° to about 100° C. by suitable cooling and/or heating means. It is often desirable or advisable to commingle the reactants and catalyst at realtively low temperatures such as from about −80° C. to about −30° C. and then to permit the reaction mixture to warm gradually while the reactants and catalyst are stirred by suitable means such as a motor-driven stirrer or other adequate equipment. After the reaction has reached the desired degree of completion, the hydrogen fluoride catalyst is removed from the reaction mixture by distillation at atmospheric or lower pressures, or by passing an inert gas through the reaction mixture while maintaining it at a relatively low temperature. Also the entire reaction mixture and catalyst may be mixed with water or may be added to ice in order to quench the activity of the hydrogen fluoride catalyst and to permit separation of the organic reaction products and unreacted starting materials from the catalyst. The organic reaction products may also be separated from aqueous hydrogen fluoride by means of an organic solvent such as ether, in which some of the organic material may be dissolved. Further means of isolating the reaction products are illustrated in the examples. Thus the product formed by reacting benzene sulfonic acid with glucose or cellulose in the presence of substantially anhydrous hydrogen fluoride at 30° C. separated into an ether-soluble and water-insoluble product and an ether-insoluble and water-soluble product.

The process of this invention broadly emphasizes the reaction of carbohydrates including simple sugars, their derivatives, compound sugars, and polysaccharides with aromatic sulfonic acids using as a catalyst, hydrogen fluoride. The type of product obtained is markedly affected by the length of time that the reactants are in contact with the hydrogen fluoride catalyst as well as the temperature of the reaction. The reaction products of this process lead to materials having diversified uses. For example, the reaction products are aryl sulfonic acids to which are attached water-soluble sugar groups and thus the products are all surface active. Some of the products are excellent detergents themselves. They can also be reacted with materials such as ethylene oxide to form higher molecular weight surface active and detergent compounds. These sulfonic acids may also be utilized as detergents in the form of their alkali metal salts or as salts of various organic bases. Some of the reaction products can be converted into thermosetting resins by heating. Resins can also be made by heating the reaction products with formaldehyde, urea, phenol, aniline, etc., and combinations of the above enumerated compounds. Nitration of some of the reaction products will give explosives. These explosives will contain nitro groups attached to the aromatic ring as well as being nitric acid esters or nitroalcohols. Various reaction products are effective for gelling paraffinic and aromatic hydrocarbons. The products are also useful intermediates in the preparation of other organic compounds, of example, 1,1-di-(sulfophenyl)-1-desoxy-glucitol can be converted to an acid chloride by reaction with phosphorous pentachloride and this acid chloride can be reacted with aromatic hydrocarbons in an manner well known to those skilled in the art to yield sulfones. The nature of this invention is illustrated by the following examples, which however, should not be construed to limit unduly the scope of this invention.

*Example I*

This example illustrates the reaction of benzene sulfonic acid with a carbohydrate, namely, cellulose. Cellulose is a polysaccharide containing glucoside linkages and with all but one of the potential aldehyde groups of the glucose residues involved in these glucosides.

As an example of the manner of conduction these experiments, the following detailed description is given: In a one liter steel turbomixer autoclave is sealed 41 grams of cellulose and 101 grams of benzene sulfonic acid. With stirring, the autoclave is then cooled to −79° C. and about 220 grams of hydrogen fluoride is added. The temperature is allowed to rise to 0° C. and the reactants are then contacted at this temperature for 36 hours. Then, a stream of nitrogen is passed through the reactor at room temperature to remove most of the hydrogen fluoride. A substantial amount of hydrogen fluoride remained behind in the reaction mixture, although most of it could have been removed by prolonging the nitrogen purge. The autoclave is opened and the product is found to be a heavy fuming brown syrup. This is then poured into a silver dish, and, depending upon the amount of hydrogen fluoride remaining therein, weighs from about 150 to 170 grams. After standing for several days in a hood-draft the product solidifies. The resulting mass is then mascerated with large quantities of absolute alcohol to remove unreacted carbohydrate, if any, and benzene sulfonic acid. During the process, the cellulose is broken down into glucose residues which become slightly soluble in alcohol. The alcohol insoluble product is treated with boiling water which after cooling and reduction in volume yields a chemical individual corresponding to 1,1-di-(sulphophenyl)-1-desoxy-glucitol of the following formula:

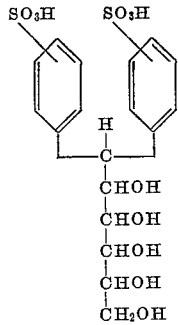

*Example II*

This experiment again illustrates the reaction of a carbohydrate, namely glucose, with an aromatic sulfonic acid. In this example 40 grams of cellulose, 101 grams of benzene sulfonic acid and about 225 grams of hydrogen fluoride are utilized. The procedure utilized in this example is the same as that described hereinabove in Example I down through allowing the product to stand in a draft. To this crude product is added one liter of benzene and the mixture is then allowed to stand for two days. The benzene is then decanted off, reduced in volume, and allowed to stand. The crystals which separate at this point are identified and correspond to the 1,1-di-(sulphophenyl)-1-desoxy-glucitol described in Example I.

The benzene insoluble part of the product is believed to contain a mono-sulphophenyl-1-desoxy-glucitol corresponding to the following structural formula:

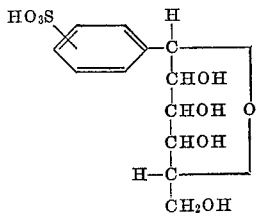

*Example III*

In this example, glucose is reacted with ortho-tolylsulfonic acid. The experiment is carried out in a steel turbomixer autoclave as described in Example I, the charge being 110 grams of ortho-tolylsulfonic acid, 40 grams of glucose and about 225 grams of hydrogen fluoride. The ortho-tolylsulfonic acid and glucose are sealed into the autoclave which is then cooled to about −30° C. at which temperature the hydrogen fluoride is added. The temperature of the autoclave is then allowed to rise to room temperature and is kept there for 12 hours during which time the mixture is stirred. Then, while continuing the stirring, a stream of nitrogen is passed through the autoclave for about 3 hours. The reaction product is washed with several portions of cold water. The cold water insoluble portion of the product is dissolved in boiling water and filtered. The filtrate is then set aside to cool and, after standing for about 24 hours at about 0° C., crystals of a chemical individual are recovered therefrom. This material, after recrystallization, is found to have the following structural formula:

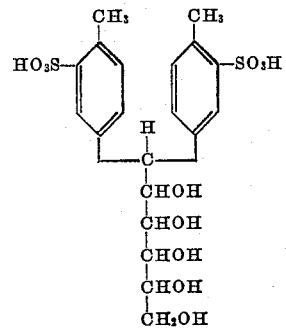

*Example IV*

In this example, starch is reacted with alpha-naphthylsulfonic acid. This experiment is carried out in a steel turbomixer autoclave as described in Example I, the charge being 133 grams of alpha-naphthylsulfonic acid, 40 grams of starch, and about 220 grams of hydrogen fluoride. The alpha-naphthylsulfonic acid and starch are sealed into the autoclave which is then cooled to about −40° C. at which tempearture the hydrogen fluoride is added. The temperature of the autoclave is then allowed to rise to room temperature and is kept there for 24 hours during which time the reaction mixture is stirred continually. Then, a stream of nitrogen is passed through the autoclave for about 6 hours. The reaction product is washed with several portions of cold water, and the cold water insoluble portion is dissolved in boiling water which is then filtered. The hot aqueous solution is cooled, and set aside at 0° C. From this cooled filtrate a new chemical entity is recovered. After recrystallization, a product is isolated of the following structural formula:

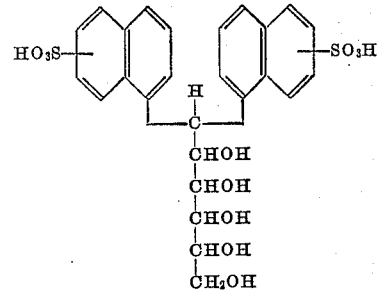

I claim as my invention:

1. A process which comprises reacting an aromatic sulfonic acid selected from the group consisting of benzene, alkylbenzene, chlorobenzene, bromobenzene, nitrobenzene and naphthylsulfonic acids with a carbohydrate selected from the group consisting of monosaccharides, oligosaccharides, and polysaccharides, in the presence of hydrogen fluoride catalyst at a temperature of from about −40° C. to about 100° C.

2. A process which comprises reacting benzene sulfonic acid with cellulose in the presence of hydrogen fluoride catalyst at a temperature of from about −40° C. to about 100° C.

3. A process which comprises reacting benzene sulfonic acid with glucose in the presence of hydrogen fluoride catalyst at a temperature of from about −40° C. to about 100° C.

4. A process which comprises reacting ortho-tolylsulfonic acid with glucose in the presence of hydrogen fluoride catalyst at a temperature of from about −40° C. to about 100° C.

5. A process which comprises reacting alpha-naphthylsulfonic acid with starch in the presence of hydrogen fluoride catalyst at a temperature of from about −40° C. to about 100° C.

References Cited in the file of this patent

UNITED STATES PATENTS

| | | |
|---|---|---|
| 2,252,725 | Niederl | Aug. 19, 1941 |
| 2,798,079 | Linn | July 2, 1957 |

OTHER REFERENCES

Hackh's Chemical Dictionary, p. 260, 3rd ed., The Blakiston Co., Phila. (1944).